United States Patent
Joliveau et al.

(10) Patent No.: US 10,277,928 B1
(45) Date of Patent: Apr. 30, 2019

(54) DYNAMIC MANIFESTS FOR MEDIA CONTENT PLAYBACK

(71) Applicant: Amazon Technologies, Inc., Seattle, WA (US)

(72) Inventors: Marc Joliveau, Seattle, WA (US); Nicholas James Benson, Seattle, WA (US); Justin Michael Binns, Auburn, WA (US); Kenneth Thomas Burford, Seattle, WA (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/876,449

(22) Filed: Oct. 6, 2015

(51) Int. Cl.
*H04N 21/238* (2011.01)
*H04N 21/2343* (2011.01)
*H04N 21/262* (2011.01)
*H04N 21/2385* (2011.01)
*H04N 21/845* (2011.01)
*G11B 27/10* (2006.01)
*H04N 21/239* (2011.01)
*H04N 21/258* (2011.01)

(52) U.S. Cl.
CPC ......... *H04N 21/2385* (2013.01); *G11B 27/10* (2013.01); *H04N 21/2393* (2013.01); *H04N 21/23439* (2013.01); *H04N 21/25808* (2013.01); *H04N 21/25891* (2013.01); *H04N 21/26258* (2013.01); *H04N 21/8456* (2013.01)

(58) Field of Classification Search
CPC .......... H04N 21/3385; H04N 21/2393; H04N 21/23439; H04N 21/25808; H04N 21/25891; H04N 21/2343; H04N 21/234309; H04N 21/234363; H04N 21/234381; H04N 21/234439; H04N 21/2353; H04N 21/2358; H04N 21/25825; H04N 21/25833; H04N 21/26258; A01B 12/006; G11B 27/10
See application file for complete search history.

(56) References Cited

U.S. PATENT DOCUMENTS

| | | | |
|---|---|---|---|
| 8,341,255 B2 * | 12/2012 | Gopalakrishnan | H04L 65/4084 709/200 |
| 9,137,278 B2 * | 9/2015 | Strasman | H04L 29/06 |
| 9,444,870 B2 * | 9/2016 | Phillips | H04L 65/601 |
| 2008/0043697 A1 * | 2/2008 | Huomo | H04L 47/14 370/342 |
| 2008/0273591 A1 * | 11/2008 | Brooks | H04N 7/1675 375/240.01 |

(Continued)

OTHER PUBLICATIONS

U.S. Appl. No. 15/483,650, filed Apr. 10, 2017, Joliveau, et al.
U.S. Office Action dated Apr. 19, 2018 issued in issued in U.S. Appl. No. 15/483,650.

*Primary Examiner* — Pinkal R Chokshi
*Assistant Examiner* — Frank Johnson
(74) *Attorney, Agent, or Firm* — Weaver Austin Villeneuve & Sampson LLP (57) ABSTRACT

Techniques are described for generating manifest files for media content playback. A server can dynamically generate manifest files with a selection of quality levels indicated as being available for playback. Factors such as device characteristics, playback history, and more can be used to generate the manifest files.

17 Claims, 8 Drawing Sheets

(56) References Cited

U.S. PATENT DOCUMENTS

| | | | |
|---|---|---|---|
| 2009/0031384 A1* | 1/2009 | Brooks | H04N 21/23439 725/127 |
| 2010/0135419 A1* | 6/2010 | Doser | H04N 21/234327 375/240.26 |
| 2011/0082946 A1* | 4/2011 | Gopalakrishnan | H04L 65/4084 709/231 |
| 2011/0235703 A1* | 9/2011 | Labrozzi | H04N 21/23424 375/240.02 |
| 2012/0054876 A1* | 3/2012 | Johansson | H04N 21/8455 726/28 |
| 2012/0278496 A1* | 11/2012 | Hsu | H04N 21/4381 709/231 |
| 2012/0278833 A1 | 11/2012 | Tam | |
| 2013/0067109 A1* | 3/2013 | Dong | H04L 65/4069 709/231 |
| 2013/0080267 A1* | 3/2013 | McGowan | H04N 21/2402 705/14.73 |
| 2013/0091249 A1* | 4/2013 | McHugh | H04N 21/23439 709/219 |
| 2013/0156094 A1* | 6/2013 | Syed | H04N 21/23424 375/240.02 |
| 2013/0179588 A1* | 7/2013 | McCarthy | H04N 21/23418 709/231 |
| 2013/0198342 A1* | 8/2013 | Xu | H04L 65/60 709/219 |
| 2013/0212223 A1* | 8/2013 | Ur | H04L 65/601 709/219 |
| 2013/0219423 A1* | 8/2013 | Prickett | H04N 21/23439 725/32 |
| 2013/0254341 A1* | 9/2013 | Ramakrishnan | H04L 47/25 709/219 |
| 2014/0129618 A1* | 5/2014 | Panje | H04N 21/26258 709/203 |
| 2014/0310424 A1* | 10/2014 | Andersson | H04L 65/4084 709/231 |
| 2014/0365889 A1* | 12/2014 | Lipman | H04L 65/403 715/719 |
| 2015/0019968 A1* | 1/2015 | Roberts | G11B 27/28 715/719 |
| 2015/0085875 A1* | 3/2015 | Phillips | H04L 65/601 370/465 |
| 2015/0089557 A1* | 3/2015 | Busse | H04N 21/23439 725/95 |
| 2015/0101003 A1 | 4/2015 | Bull et al. | |
| 2015/0113407 A1* | 4/2015 | Hoffert | G06F 3/0482 715/720 |
| 2015/0146012 A1* | 5/2015 | Shipley | H04L 65/80 348/177 |
| 2016/0088322 A1* | 3/2016 | Horev | H04N 21/8456 725/14 |
| 2016/0127260 A1* | 5/2016 | Gordon | H04L 47/783 709/226 |
| 2016/0294898 A1* | 10/2016 | Wheelock | H04L 65/4076 |
| 2017/0078744 A1 | 3/2017 | VanBlon et al. | |

* cited by examiner

Quality: 4K UHD

Fragment A: Time range = 5 minutes 20 seconds to 5 minutes 50 seconds, Location = CDN\Media\Movies\AO9382a_2983.ismv
Fragment B: Time range = 5 minutes 51 seconds to 6 minutes 21 seconds, Location = CDN\Media\Movies\AO938a2_2984.ismv
...

Quality: 1080P

Fragment A: Time range = 5 minutes 20 seconds to 5 minutes 50 seconds, Location = CDN\Media\Movies\AO9382b_2983.ismv
Fragment B: Time range = 5 minutes 51 seconds to 6 minutes 21 seconds, Location = CDN\Media\Movies\AO9382b_2984.ismv
...

610

Quality: 1080P

Fragment A: Time range = 5 minutes 20 seconds to 5 minutes 50 seconds, Location = CDN\Media\Movies\AO9382b_2983.ismv
Fragment B: Time range = 5 minutes 51 seconds to 6 minutes 21 seconds, Location = CDN\Media\Movies\AO9382b_2984.ismv
...

Quality: 720P

Fragment A: Time range = 5 minutes 20 seconds to 5 minutes 50 seconds, Location = CDN\Media\Movies\AO9382_2983c.ismv
Fragment B: Time range = 5 minutes 51 seconds to 6 minutes 21 seconds, Location = CDN\Media\Movies\AO9382_2984c.ismv
...

Quality: 576i

Fragment A: Time range = 5 minutes 20 seconds to 5 minutes 50 seconds, Location = CDN\Media\Movies\AO9382_2983d.ismv
Fragment B: Time range = 5 minutes 51 seconds to 6 minutes 21 seconds, Location = CDN\Media\Movies\AO9382_2984d.ismv

DYNAMIC MANIFESTS FOR MEDIA CONTENT PLAYBACK

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content (e.g., movies, television shows, videos, music, and electronic books) is often streamed over networks using adaptive bitrate streaming for playback on a viewer's device. Adaptive bitrate streaming includes determining the viewer device's bandwidth and hardware resources (e.g., available central processing unit (CPU) capacity) in real time and adjusting the quality of the media content that is requested from a media server and played back on the viewer's device to account for changes in the bandwidth and hardware resources. Fragments at different quality levels, or bitrates, of the media content detailed in a manifest file are requested individually and stored in a buffer for playback. Unfortunately, the heuristic algorithms for requesting fragments are implemented on the viewer device, resulting in the media server being limited in its ability to influence the playback of the media content.

DETAILED DESCRIPTION

This disclosure describes techniques for implementing dynamic manifests that can allow for flexibility of decisions made by an adaptive bitrate streaming heuristic implemented on viewer devices from the server-side. For example, when a viewer requests media content (e.g., a movie, a television show, a video, a music track or album, an electronic book, etc.) to stream for playback on a device, the bandwidth of the Internet connection available to the viewer's device and the availability of the hardware resources of the viewer's device can be used by a heuristic algorithm (implemented by the viewer's device) to determine a quality level, or bit rate, of the media content to be requested from a media server. The viewer's device uses a manifest file provided by the media server that details fragments, or segments of time, of the playback of the media content available at different quality levels. The media server can provide a subset of the available quality levels in the manifest file provided to the viewer device to influence (e.g., limit) the selections made by the heuristic algorithm. For example, a server can generate a manifest file for the viewer device by considering the request, characteristics of the viewer device, playback history, and other factors. As a result, viewer devices may receive different manifest files indicating different quality levels available to be requested for the same media content. Other types of data, such as available subtitles, audio quality or bitrates, etc. can also differ between the generated manifest files.

Figure 1:
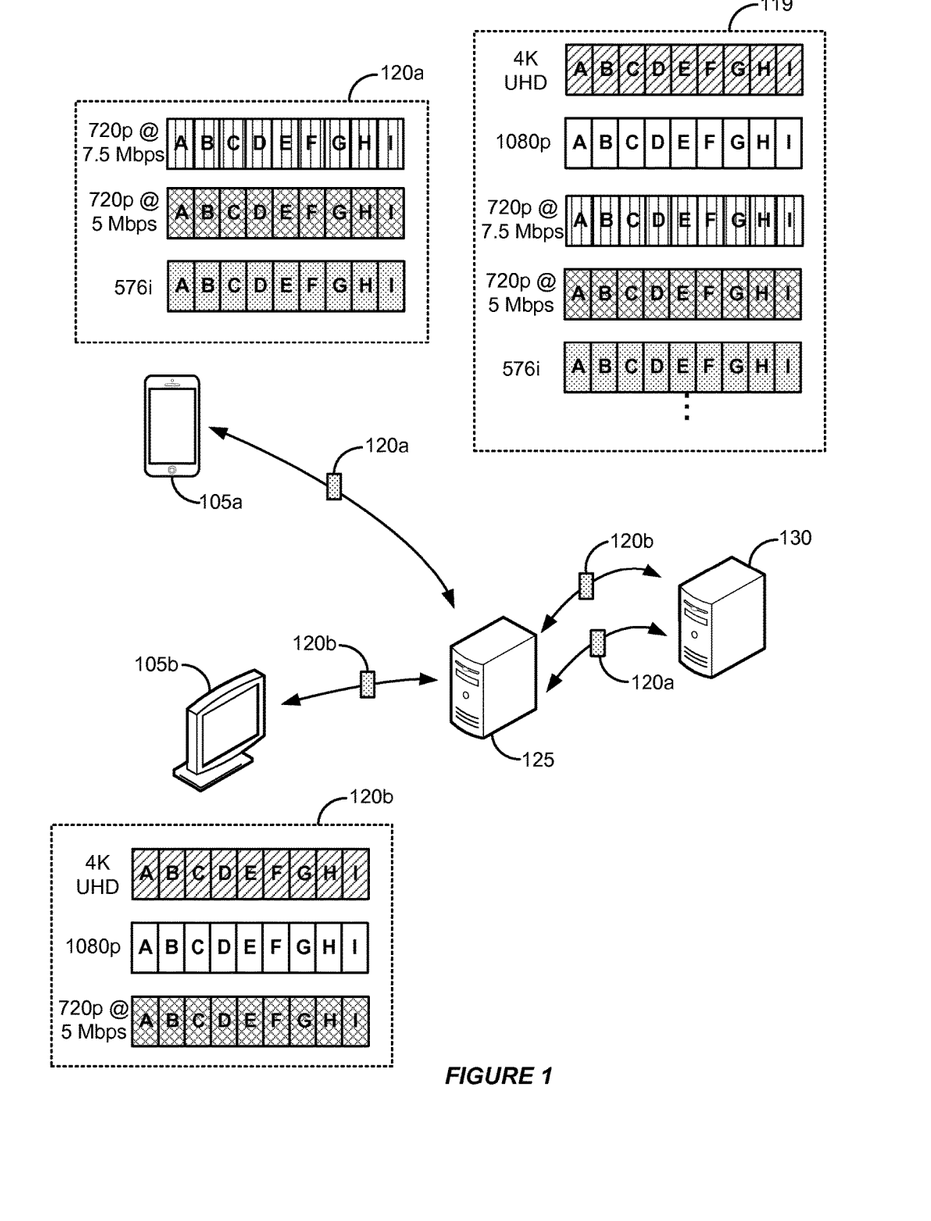
FIG. 1 illustrates an example of dynamic manifests for media content playback.

FIG. 1 illustrates an example of dynamic manifests for media content playback. As shown in FIG. 1, viewer devices 105a and 105b can receive manifest data such as manifest files 120a and 120b (which can be markup files or other types of data structures), respectively, providing playback options for the same media content. In the depicted implementation, manifest files 120a and 120b can be dynamically generated by manifest server 130 in communication with media server 125. For example, viewer devices 105a and 105b can both request playback of the same media content (e.g., episode #1 of the television show Transparent) by providing requests to media server 125 to stream the media content for playback on viewer devices 105a and 105b. Media server 125 can contact manifest server 130 regarding the requests and manifest server 130 can then generate manifest files 120a and 120b based on information from manifest data 119. In the example of FIG. 1, manifest data 119 indicates all of the fragments for playback of the media content at the 4K UHD, 1080p, 720p at 5 megabits per second (Mbps), 720p at 7.5 Mbps (e.g., providing a higher frame rate than the 720p at 5 Mbps quality level), and 576i video quality levels (or bitrates). That is, manifest data 119 provides fragments for encodings of the media content at five different quality levels at several resolutions as well as possible bitrates within the resolutions (e.g., the 720p resolution at 5 Mbps and 7.5 Mbps). Manifest server 130 can generate manifest file 120a indicating that the fragments of the media content can be requested at the 720p at 5 Mbps, 720p at 7.5 Mbps, and 576i quality levels. By contrast, manifest server 130 can generate manifest 120b indicating that the fragments of the same media content can be requested at the 4K ultra-high-definition (UHD), 1080p, and 720p at 5 Mbps quality levels. That is, manifest file 120b can indicate more quality levels available for playback and higher quality levels (i.e., higher bitrates) available for playback. Manifest files 120a and 120b can be provided to viewer devices 105a and 105b, respectively, by media server 125. As a result, viewer device 105a can request fragments at the 720p at 5 Mbps, 720p at 7.5 Mbps, and 576i quality levels for playback of the media content since those are the quality levels provided in manifest 120a. Viewer device 105b can request fragments at the 4K UHD, 1080p, and 720p at 5 Mbps quality levels for playback of the same media content since those are the quality levels provided in manifest 120b.

In more detail, when viewer devices 105a and 105b indicate that streaming of media content is to begin, a request can be provided to media server 125 to provide a manifest file indicating fragments, or segments, of the playback of the media content available at different quality levels. The manifest file includes metadata that allows the viewer device to generate properly formatted requests for specific fragments of the media content. A sequence of fragments together provides playback of the full media content. Audio portions of the media content can also be provided in fragments. Additional information, such as available subtitles, can also be provided in the manifest file.

Viewer devices 105a and 105b can implement heuristic algorithms to determine the quality level of the fragments of the media content to request to provide streaming playback of the media content based on manifest files 120a and 120b, respectively. For example, viewer device 105a might be a smartphone running an operating system or software application utilizing a heuristic algorithm that determines which quality level to select fragments at based on the bandwidth of the Internet connection (or other network connection) that viewer device 105a uses to communicate with media server 125 and the hardware resources, such as the central processing unit (CPU) availability or capacity. As the available bandwidth increases and/or CPU availability increases, the heuristic algorithm can request higher-quality fragments of the media content for playback by parsing the manifest file and selecting higher-quality fragments for requests. As the available bandwidth decreases and/or CPU availability decreases, then lower-quality fragments of the media content can be requested for playback. As a result, viewer device 105a determines which fragments to select and request from media server 125 to provide playback of the media content by using the data in manifest file 120a. Viewer device 105b might be a smart television implementing the same or a different heuristic algorithm for selecting fragments of the media content for playback.

Media server 125 can be an edge server of a content delivery network (CDN) which can have a cache for providing fragments of the media content for streaming playback on viewer devices 105a and 105b, as well as receive fragments from other components of the CDN (e.g., origin servers). In FIG. 1, media server 125 can communicate with manifest server 130, which can be an application server that can be part of or external to the CDN. In some implementations, the functionality of both media server 125 and manifest server 130 can be implemented within the same server, both within the same CDN, or across several servers. Media server 125 can provide information regarding viewer devices 105a and 105b making the requests for the manifest files to manifest server 130 that can be used to generate manifest files 120a and 120b.

Manifest server 130 can include metadata regarding the requested media content that can be used to dynamically generate manifest files 120a and 120b for viewer devices 105a and 105b, respectively. Additionally, manifest server 130 can use the information provided by media server 125 to determine the metadata to include in manifest files 120a and 120b.

For example, manifest server 130 can be provided a request from media server 125 to dynamically generate manifest files corresponding to the requests to stream the media content from viewer devices 105a and 105b. Media server 125 might provide the title (or other type of identifier) of the media content to manifest server 130. Manifest server 130 includes metadata such as manifest data 119 indicating the fragments for playback of the video portion of the media content corresponding to the title at the 4K UHD, 1080p, 720p at 5 Mbps, 720p at 7.5 Mbps, and 576i quality levels, or bitrates. The quality levels descend from highest-quality (and highest bitrate) to lowest-quality (and lowest bitrate) in order from 4K UHD, 1080p, 720p at 7.5 Mbps, 720p at 5 Mbps, and 576i. Manifest server 130 can generate manifest files 120a and 120b by selecting some of the quality levels metadata to be provided in the manifest files. Manifest files 120a and 120b can also be generated to include different selections of the quality levels detailed in the respective manifest files. For example, viewer devices 105a and 105b can have different characteristics (e.g., screen sizes, hardware, etc.), request playback at different times, communicate with media server 125 from different geographic locations, communicate with media server 125 through different Internet Service Providers (ISPs) or other network connections, and have different histories of playback of media content from media server 125. Manifest server 130 can consider these factors and dynamically generate manifest files 120a and 120b such that they indicate different quality levels of fragments available for playback.

In the example of FIG. 1, manifest file 120a can be generated by manifest server 130 to indicate to viewer device 105a how to request and play back fragments A-I at the 720p at 5 Mbps, 720p at 7.5 Mbps, and 576i quality levels. For example, fragment A can provide playback of the media content from 1 minute 30 seconds to 1 minute 50 seconds. Fragment B can provide playback of the media content from 1 minute 50 seconds to 2 minutes 10 seconds. The fragments can be requested at the 720p at 5 Mbps, 720p at 7.5 Mbps, or 576i quality levels. Manifest file 120b can be generated by manifest server 130 to indicate to viewer device 105b how to request and play back fragments A-I of the same media content associated with manifest 120a at the 4K UHD, 1080p, and 720p at 5 Mbps quality levels. Manifest file 120b has fragments A-I available at more quality levels than manifest 120a. Fragments at the missing quality levels cannot be requested by viewer devices 105a and 105b because the requests for them cannot be properly made due to them missing from the respective manifest files.

Manifest files 120a and 120b might indicate different quality levels of fragments available for playback due to the factors previously described. For example, viewer device 105b might be determined to be a smart television with a relatively large screen and viewer device 105a might be determined to be a smartphone with a relatively small screen. Viewer device 105a can have the capability to play back media content at quality levels from 1080p and below, but manifest server 130 might generate, or create, manifest file 120a with the 720p at 7.5 Mbps quality level as the highest available quality level indicated in manifest file 120a (i.e., exclude the capability for viewer device 105a to request fragments at the 1080p quality level by not including it in manifest file 120a) since the viewer would not benefit from the higher quality level on a smaller screen. Additionally, the heuristic algorithm implemented by viewer device 105a may be relatively aggressive, resulting in rebuffering events interrupting the playback of the media content if manifest file 120a indicated that fragments at the 1080p quality level can be requested for playback since the heuristic algorithm might favor higher-quality fragments for playback over avoiding rebuffering. By contrast, viewer device 105b might be restrained from requesting playback at the lowest quality level (i.e., 576i) since a lower quality level would not be visually appealing on the larger screen of the smart television, either for any type of media content, or for the particular media content requested (e.g., media content with elaborate special effects might be indicated by manifest server 130 to be played at higher quality levels). Additionally, the heuristic algorithm implemented by viewer device 105b may be relatively unaggressive, favoring playback at lower quality levels when higher quality levels can be played back.

As a result, by dynamically generating manifest files 120a and 120b with manifest server 130 using manifest data 119, viewer devices 105a and 105b can be provided manifest files 120a and 120b, respectively, and provided with different playback options for the same media content. This may allow for the server-side (i.e., media server 125 and manifest server 130) to have more influence over the playback decisions of the media content by the heuristic algorithms implemented on viewer devices 105*a* and 105*b*. For example, an aggressive heuristic algorithm can be somewhat throttled by excluding details regarding fragments at higher quality levels from the manifest file.

Figure 2:
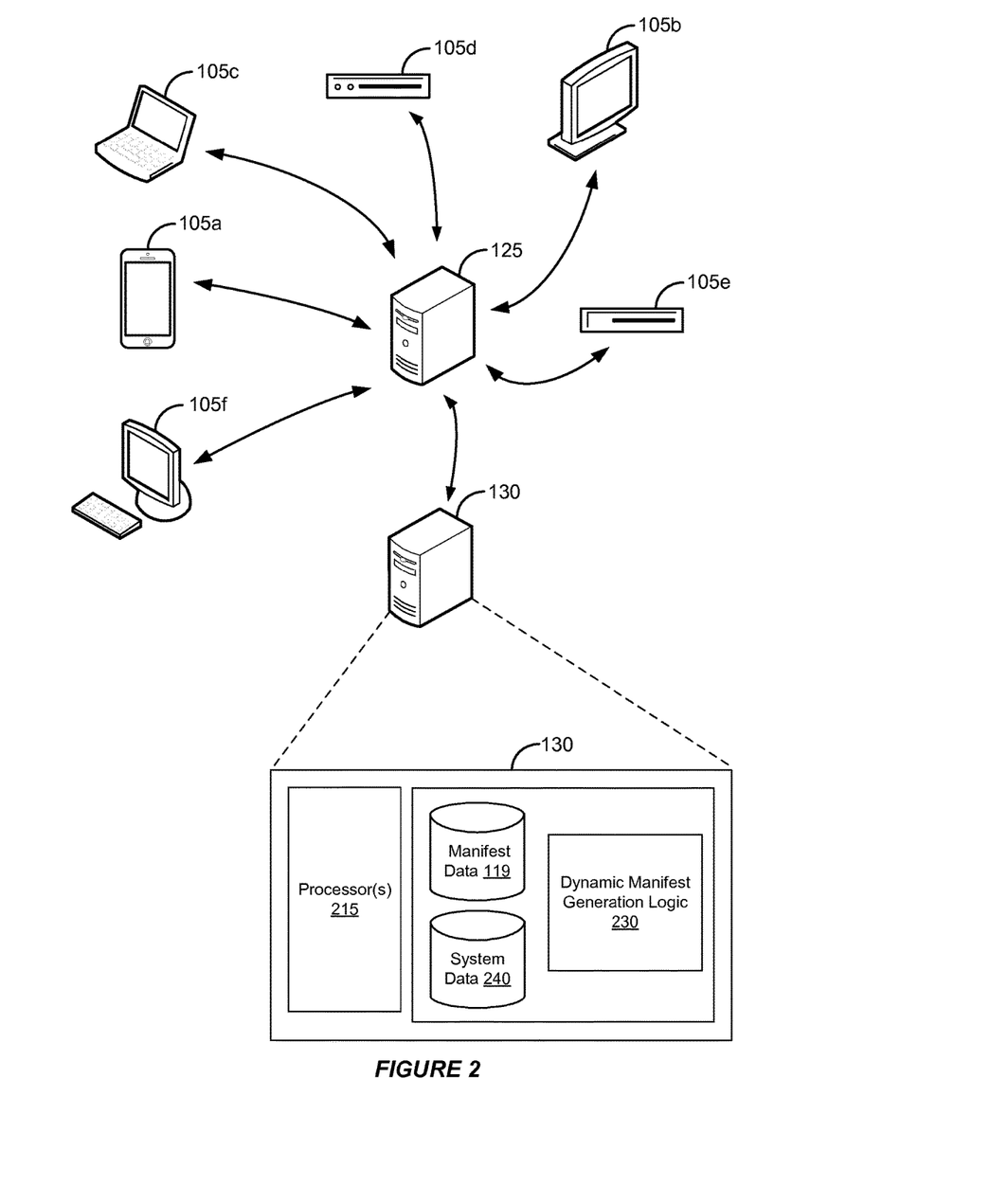
FIG. 2 illustrates an example of a computing environment in which dynamic manifests can be used for media content playback.

FIG. 2 illustrates an example of a computing environment in which dynamic manifests can be used for media content playback. The computing environment of FIG. 2 includes media server 125 which can be used to provide media content for playback on viewer devices 105*a-e*. Viewer device 105*a* is a smartphone, viewer device 105*b* is a television, viewer device 105*c* is a laptop computer, viewer device 105*d* is a set-top box, viewer device 105*e* is a video game console, and viewer device 105*f* is a desktop computer. Other types of devices such as tablets, wearable devices (e.g., smart watches), virtual reality headsets, etc. may also be included in the computing environment.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 125 and/or manifest server 130 may be part of a content delivery system that conforms to any of a wide variety of architectures. The functionality and components of media server 125 and manifest server 130 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on viewer devices 105*a-e*), integrated into a separate app from another entity, implemented in an edge server or content server of a CDN, a server of an ISP, etc.

Media server 125 can include various types of logic used to provide media content for playback at viewer devices 105*a-f*. In FIG. 2, media server can include media content storage for storing fragments of media content and playback handling logic to provide fragments to viewer devices 105*a-f*.

Manifest server 130 can include various types of logic used to dynamically generate manifest files for facilitating the playback of media content by viewer devices 105*a-f*. Manifest server 130 also can include one or more processors 215, memory, and other hardware for performing the tasks disclosed herein. Media server 125 and viewer devices 105*a-f* can also include processors, memory, and other hardware.

Dynamic manifest generation logic 230 uses data stored by manifest data 119 and system data 240 to generate manifest files that can be provided to viewer devices 105*a-f* for playback of media content. For example, manifest data 199 can include data including details regarding fragments of the video portion of the playback for media content, details regarding fragments of the audio portion of the playback for media content, subtitles, and other types of data related to the playback of media content (e.g., the playback options). System data 240 can store data regarding device characteristics, network conditions, playback history from viewer devices 105*a-f*, and other types of data described herein that can be used to select data from manifest data 119 to generate manifest files. In some implementations, the data within system data 240 can be dynamic and changing through time and may be provided from a variety of sources.

Figure 3A:
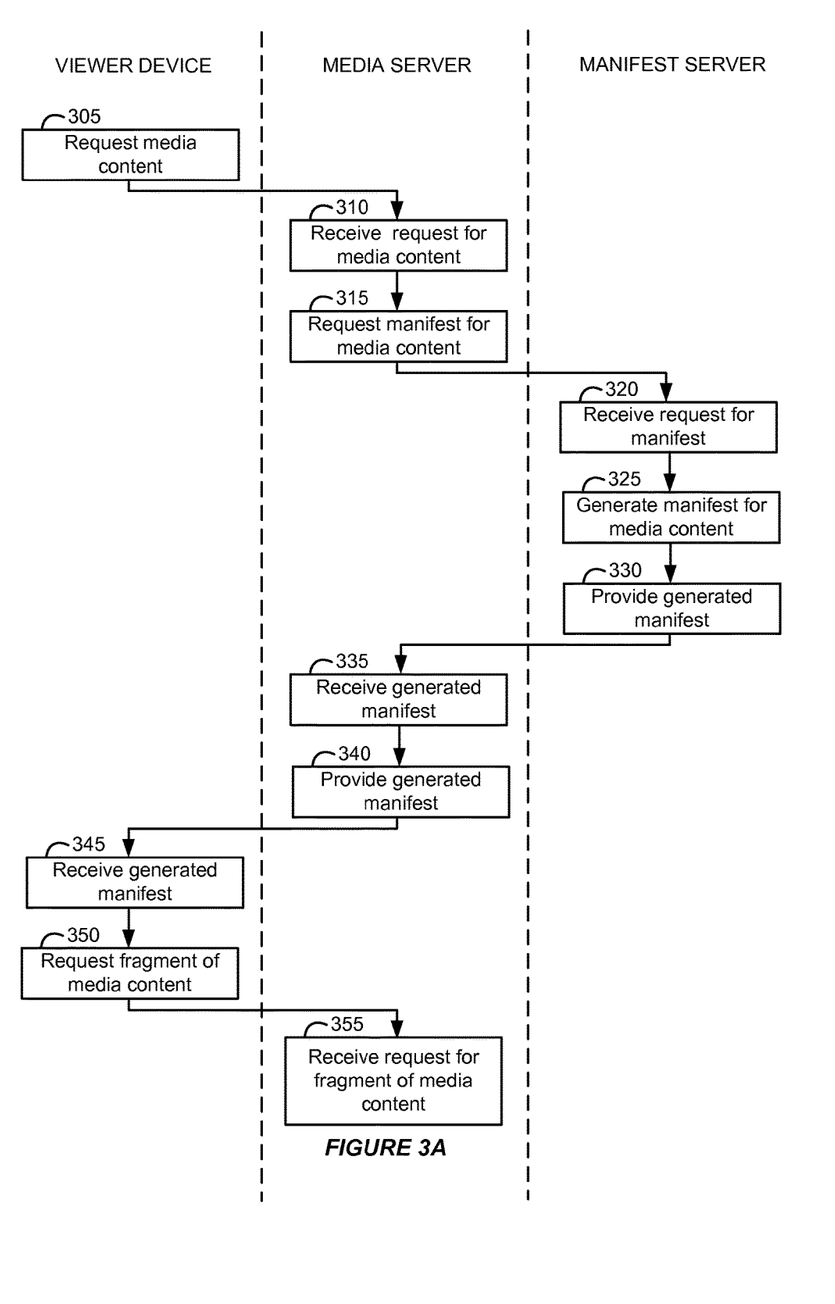
FIGS. 3A and 3B are a flowchart illustrating providing dynamic manifests for media content playback.

A specific implementation will now be described with reference to FIG. 1, the computing environment of FIG. 2, and the flow diagrams of FIGS. 3A and 3B. In FIG. 3A, a viewer device (e.g., one of devices 105*a-f*) can request media content, for example, by selecting an episode of a television show for playback from a video streaming service in a web browser or software program, and therefore, request a particular episode from media server 125 (305). The request can be provided to and received by media server 125 (310). Media server 125 can then request a manifest file for the specific media content (e.g., the particular episode selected for playback from the video streaming service) from manifest server 130 (315). For example, media server 125 can provide an identifier of the specific media content (e.g., title, catalog number, episode number, etc.) to manifest server 130. Additionally, media server 125 can provide additional information regarding the request received from the viewer device, such as an IP address of the viewer device and information regarding the viewer device (e.g., the type of device) to manifest server 130. As a result, manifest server 130 can receive the request, as well as additional data regarding the request and data regarding the viewer device that initiated the request (320).

Manifest server 130 can dynamically generate a customized manifest file for the viewer device using the data provided by media server 125, manifest data 119, and system data 240 (325). Different combinations of data provided by media server 125 related to the request and the additional data stored by or accessible by manifest server 130 can be used to generate different manifest files, for example, to different viewer devices, or even to the same viewer device requesting media content at different times or from different geographical locations.

Figure 4:
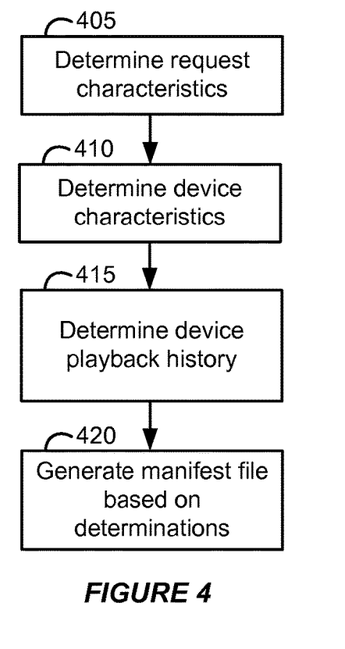
FIG. 4 is a flowchart illustrating generating a dynamic manifest for media content playback.

FIG. 4 is a flowchart illustrating generating a dynamic manifest for media content playback. In FIG. 4, characteristics of the request made by viewer device 105*a* to stream media content can be determined and used to generate manifest file 120*a* (405). For example, the title of the request may be used by dynamic manifest generation logic 230 of manifest server 130 to select a first subset of manifest data 119 related to the title of the media content being requested by viewer device 105*a*. For example, manifest data 119 might include details regarding fragments of many media content titles provided by the video streaming service. As a result, the fragments (at different quality levels) of a single title can be provided in manifest file 120*a* for streaming play back of the requested media content.

Additionally, other characteristics, such as the time when the request was received, can be used to further select another subset of data from the first subset related to the title. For example, a request received after 5:00 PM and before 10:00 PM might result in fewer quality levels included in a manifest file 120a than a request received at other times because the time range between 5:00 PM and 10:00 PM might experience more requests from many viewer devices, and therefore, excluding higher quality fragments (which may be larger in size, and therefore, increase congestion on networks if being transferred to viewer device 105a) from being detailed in manifest file 120a can result in viewer device 105a reducing the load on media server 125.

Additionally, characteristics of viewer device 105a can also be considered when determining the quality levels to include in manifest file 120a (410). For example, media server 125 can provide a device identification to manifest server 130, or media server 125 can provide another type of identifier (e.g., one related to the account being used by viewer device 105a) that can be correlated with the type of viewer device that is requesting to play back the media content. Some viewer devices might use an operating system or software program that uses a relatively aggressive heuristic to select and request the fragments detailed in manifest files for playback, as previously discussed. By contrast, other viewer devices might use an operating system or software program that uses a relatively unaggressive heuristic. As a result, a manifest file being generated for the viewer device identified as using an aggressive heuristic can exclude quality levels at or above a threshold quality level such that when the manifest file is delivered to the viewer device, the viewer device would not be able to request the excluded fragments. Rather, only lower quality level fragments can be requested. By contrast, the manifest file being generated for the viewer device identified as using an unaggressive heuristic can exclude the quality levels at or below a threshold quality level so that the viewer device would not be able to request the excluded, lower quality fragments. The data regarding types of devices and the quality levels they might exclude can be detailed within system data 240. In some implementations, the location of the device can also be used to select the quality levels to include in a manifest file. For example, a device in one country might be provided higher quality levels than another device in another country.

Manifest server 130 can also determine information regarding the playback history of the viewer device when generating a manifest file (415). For example, if the viewer device has a history of rebuffering at a particular time (a historical rebuffering time period, for example, due to heavy network activity within the home, such as many family members using the Internet connection for a variety of purposes at the same time on most weekdays), then a higher quality level can be excluded from the manifest file if at least a portion of (or all) the playback of the media content would overlap with the time range that the device tends to rebuffer. That is, when the viewer device requests playback of the media content, the playback time period of the media content can be determined from the time of the request (e.g., if the request is made at 1:00 PM and the playback time for the media content is 2 hours, then the playback time period would be from 1:00 PM to 3:00 PM assuming no pauses), and if the playback time period overlaps with the historical rebuffering time period, then quality levels within a high quality range might be excluded from the manifest file so that the viewer device cannot request higher quality fragments. In some implementations, manifest server 130 might generate the manifest file such that fragments at a high quality level are provided for portions of the playback that are not expected to be within the historical rebuffering time period, but fragments corresponding with the portion of the playback that is expected to overlap with the historical rebuffering time period can be excluded, or be inflated or deflated, as described later herein. As a result, rebuffering can be avoided to provide a better viewing experience. Additionally, playback history of multiple viewer devices in the aggregate can be considered when generating a manifest file. For example, if the viewer device is in a location in which rebuffering by other viewer devices is particularly common at a certain time, then higher quality levels can also be excluded from the manifest file when it is generated.

Figure 6:
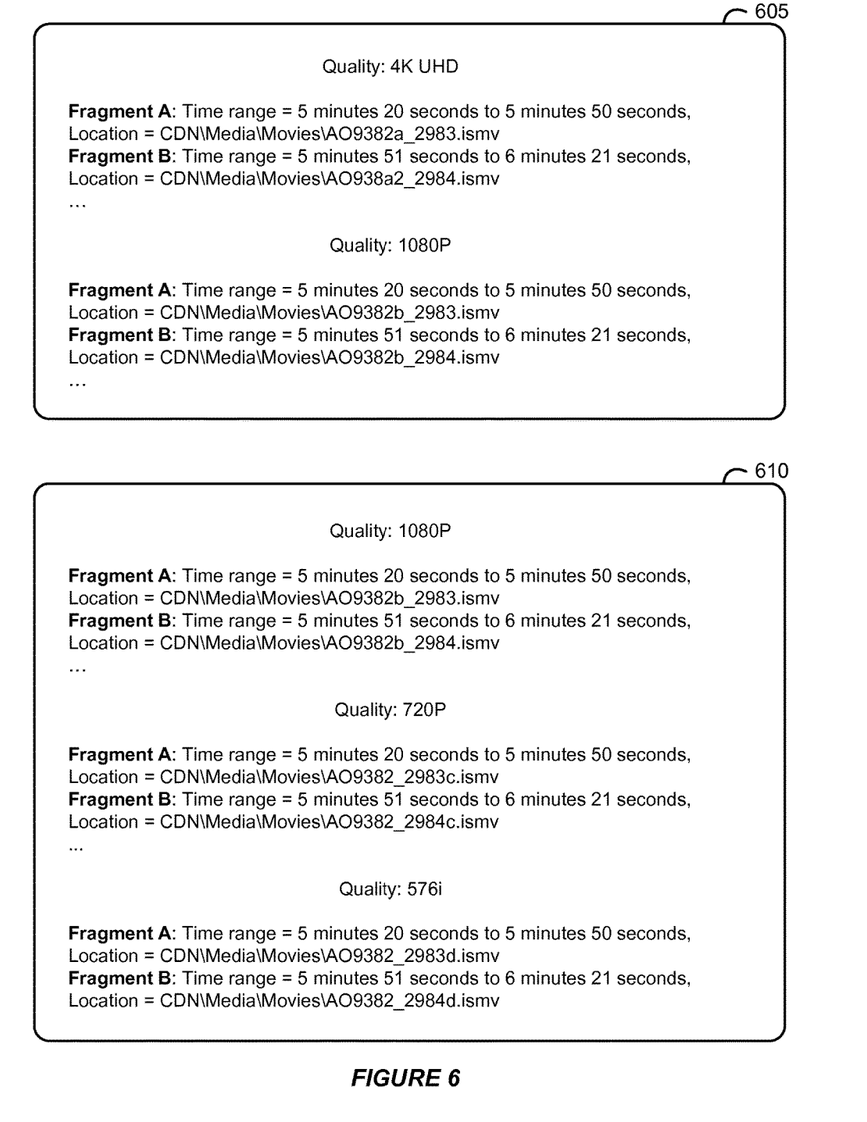
FIG. 6 illustrates an example of dynamic manifests for media content playback.

As a result, a manifest file can be generated by manifest server 130 and provided to media server 125 (330, 420). As another example, FIG. 6 illustrates an example of dynamic manifests for media content playback. Manifest files 605 and 610 in FIG. 6 provide abstract examples of representations of manifest files. In the example of FIG. 6, manifest file 605 includes quality levels at the 4K UHD and 1080p quality levels. Manifest file 610 includes quality levels at the 1080p, 720p, and 576i quality levels. Both manifest files 605 and 610 can provide for viewer devices to play back the same media content, but at different available quality levels, as previously discussed.

Figure 5:
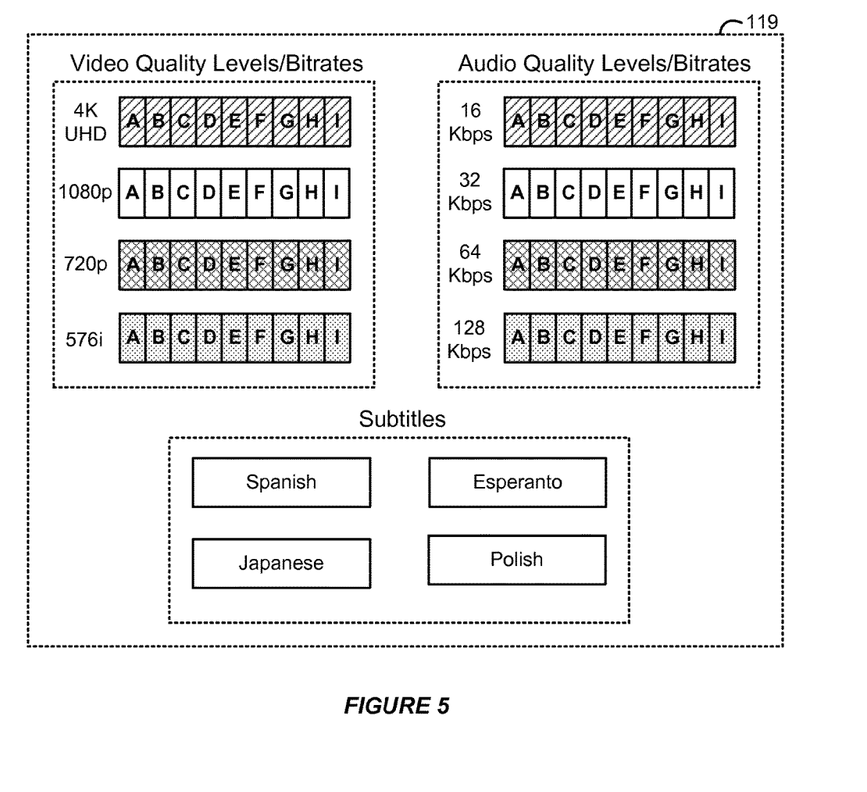
FIG. 5 illustrates an example of data sources for generating a dynamic manifest for media content playback.

Though the above examples describe generating manifest files by including, or excluding, certain quality levels of the manifest data for the media content, additional data can be included or excluded in the generated manifest files. FIG. 5 illustrates an example of data sources for generating a dynamic manifest for media content playback. In the example of FIG. 5, video quality levels (of the video portion of the playback), audio quality levels (of the audio portion of the playback), and subtitles can be selected to generate a manifest file based on any of the aforementioned determinations.

Figure 3B:
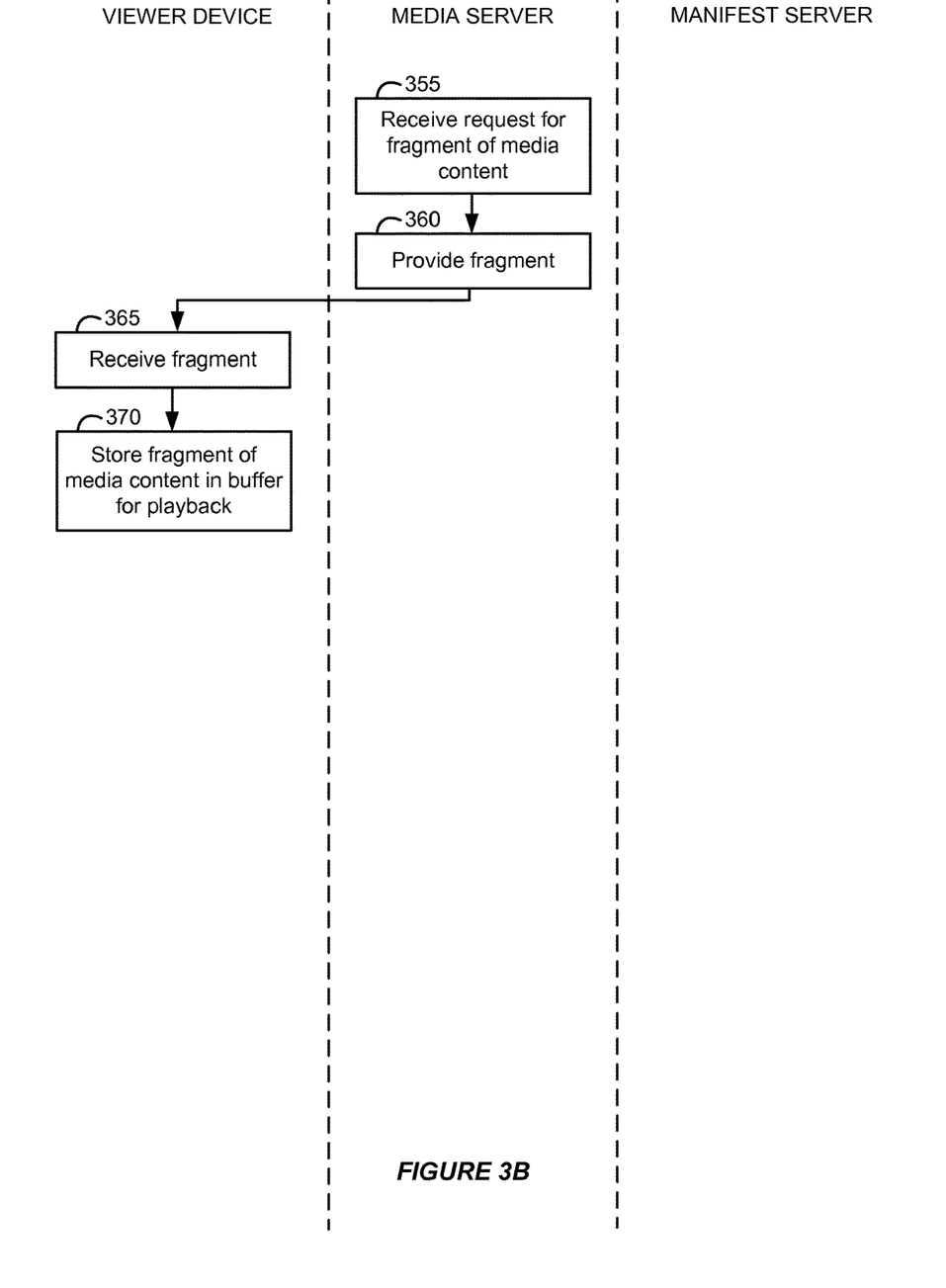

Referring back to the flow diagram of FIGS. 3A and 3B, media server 125 can then receive the manifest file generated by manifest server 130 (335) and provide the manifest file to the viewer device (340). The viewer device can receive the manifest file (345) and begin playback of the media content by requesting a fragment at one of the quality levels indicated in the generated manifest file (350). As a result, the request for the fragment can be received by media server 125 (355), media server 125 can retrieve and provide the requested fragment (360), and the viewer device can receive the fragment (365) and store the fragment in a buffer for playback (370).

In some implementations, the manifest file can be updated or replaced due to changing conditions. For example, if network conditions have degraded or are expected to degrade (e.g., the ISP used by the viewer device is experiencing technical difficulties, bandwidth is expected to degrade, etc.), then manifest server 130 can generate a new manifest file to be provided to the viewer device with different details. As one example, quality levels that were previously included in a prior manifest file can be excluded. As another example, quality levels that were previously excluded in the prior manifest file can now be included due to network conditions expected to improve. Manifest server 130 can generate the new manifest files and the new manifest files can be "pushed" to viewer devices. In some implementations, viewer devices might request to receive new manifest files if they are available, for example, at periodic intervals.

Figure 7:
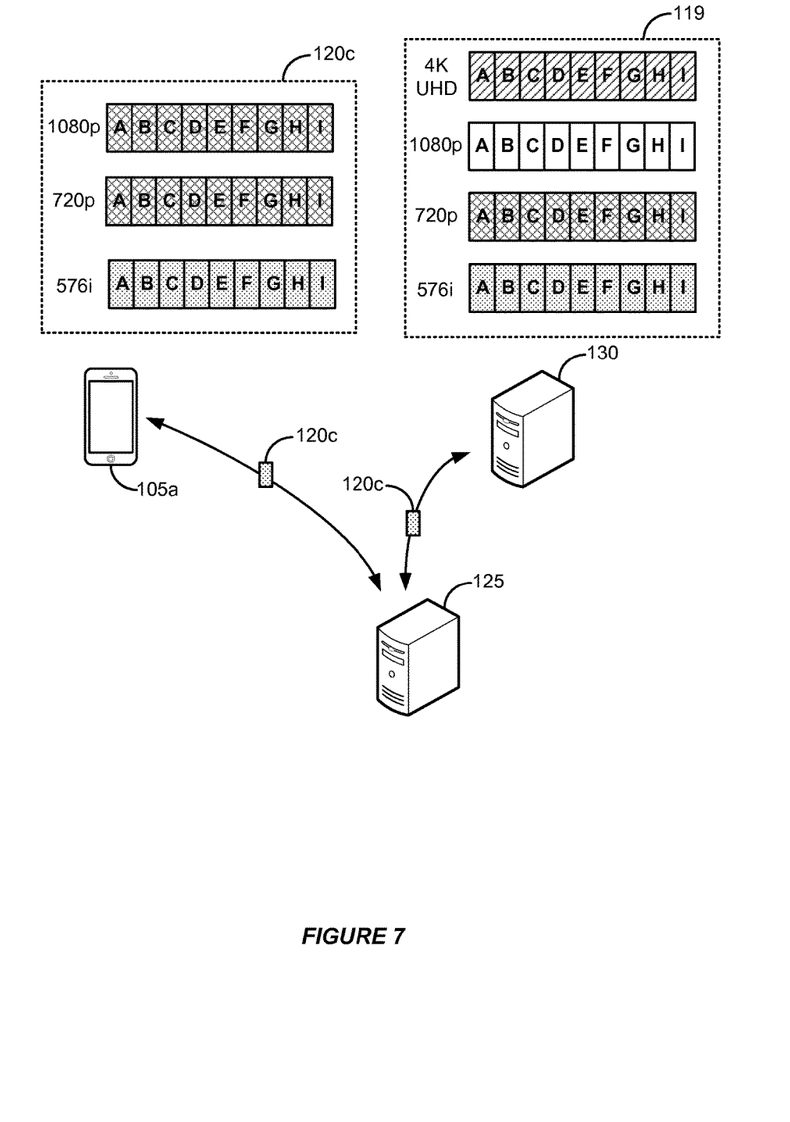
FIG. 7 illustrates an example of a dynamic manifest implementing bitrate inflation for media content playback.

FIG. 7 illustrates an example of a dynamic manifest implementing bitrate inflation for media content playback. In FIG. 7, manifest file 120c can be generated by manifest server 130 and indicate that fragments can be requested at the 1080p, 720p, and 576i quality levels. However, when generated by manifest server 130, manifest file 120c can have the fragments indicated as being for the 1080p quality level be the same fragments as those for the 720p quality level. That is, the fragments that are supposed to be at the 1080p quality level actually provide playback at the 720p quality level instead. This may allow for viewer device 105a to request fragments at the 1080p level, but actually be provided fragments at a different quality level. In other implementations bitrate deflation may be used wherein fragments of a higher quality level can be the same fragments of a lower quality level or bitrate. As previously discussed, a portion of a quality level can be represented by fragments at one quality level and another portion of the quality level can be represented by fragments at another quality level. For example, regarding the 1080p quality level of manifest file 120c, fragments A-D might actually be at the 1080p quality level, but fragments E-I might be at the 720p quality level. This may allow throttling of a relatively aggressive heuristic, as previously discussed, but with the heuristic believing it is streaming at a quality level that may be different than what it is actually being provided.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method, comprising:
receiving, by a server, a first indication that a first viewer device has requested media content;
selecting, by the server, data representing fragments of the media content at a first plurality of quality levels;
generating, by the server, first manifest data representing playback options of the media content at the first plurality of quality levels based on characteristics of the first viewer device, each of the first plurality of quality levels being associated with one of a first plurality of request formats for requesting fragments of the media content, each of the plurality of request formats corresponding to playback of the requested media content corresponding to the first indication, a first quality level of the first plurality of quality levels being associated with a first request format in the first plurality of request formats, the first request format representing a fragment of the media content that is at a quality level different than the first quality level;
providing, by the server, the first manifest data for playback of the media content at the first viewer device;
receiving a first request from the first viewer device for a first fragment corresponding to a first segment of the media content, the first request having been generated by the first viewer device to obtain a fragment at the first quality level of the first plurality of quality levels represented in the first manifest data;
providing to the first viewer device, in accordance with the first manifest data, a second fragment corresponding to the first segment of the media content, the second fragment corresponding to a second quality level of the first plurality of quality levels represented in the first manifest data that is lower than the first quality level represented in the first manifest data;
receiving, by the server, a second indication that a second viewer device has requested the media content;
selecting, by the server, data representing fragments of the media content at a second plurality of quality levels;
generating, by the server, second manifest data representing playback options of the media content at the second plurality of quality levels based on characteristics of the second viewer device, the second plurality of quality levels including a different set of quality levels than the second plurality of quality levels; and
providing, by the server, the second manifest data for playback of the media content at the second viewer device;
receiving a second request from the second viewer device for a third fragment corresponding to a second segment of the media content, the second request having been generated by the second viewer device to obtain a fragment at a third quality level of the second plurality of quality levels represented in the second manifest data;
providing to the second viewer device, in accordance with the second manifest data, a fourth fragment corresponding to the second segment of the media content, the fourth fragment corresponding to a fourth quality level of the second plurality of quality levels represented in the second manifest data that is higher than the third quality level represented in the second manifest data.

2. The computer implemented method of claim 1, wherein the fragments of the first and second pluralities of quality levels correspond to segments of a video portion of the playback of the media content, and the quality levels correspond to different bitrates of the playback of the media content.

3. The computer implemented method of claim 1, wherein the first plurality of quality levels is selected based at least in part on a determination that the first viewer device is a first device type, and the second plurality of quality levels is selected based at least in part on a determination that the second viewer device is a second device type, the first device type and the second device type being different.

4. The computer implemented method of claim 1, wherein the first plurality of quality levels is selected based at least in part on a playback history corresponding to the first viewer device, and the second plurality of quality levels is selected based at least in part on a playback history corresponding to the second viewer device.

5. A computing device, comprising:
one or more processors and memory configured to:
receive a first indication that a first viewer device has requested media content;
generate first manifest data representing playback options of the media content at a first plurality of quality levels selected based on characteristics of the first viewer device, each of the first plurality of quality levels being associated with one of a plurality of request formats for requesting fragments of the media content, each of the plurality of request formats corresponding to playback of the requested media content corresponding to the first indication, a first quality level of the first plurality of quality levels being associated with a first request format in the plurality of request formats, the first request format representing a fragment of the media content that is at a quality level different than the first quality level;

provide the first manifest data for playback of the media content at the first viewer device;

receive a first request from the first viewer device for a first fragment corresponding to a first segment of the media content, the first request having been generated by the first viewer device to obtain a fragment at the first quality level of the first plurality of quality levels represented in the first manifest data;

provide to the first viewer device, in accordance with the first manifest data, a second fragment corresponding to the first segment of the media content, the second fragment corresponding to a second quality level of the first plurality of quality levels represented in the first manifest data that is different than the first quality level represented in the first manifest data.

6. The computing device of claim 5, wherein the first plurality of quality levels has a different number of quality levels than the second plurality of quality levels.

7. The computing device of claim 5, wherein the first and second manifest data include data representing fragments corresponding to segments of a video portion of the playback of the media content, and the quality levels correspond to different bitrates corresponding to playback of the media content.

8. The computing device of claim 5, wherein the first plurality of quality levels is based at least in part on a determination that the first viewer device is a first device type, and the second plurality of quality levels is based at least in part on a determination that the second viewer device is a second device type, the first device type and the second device type being different.

9. The computing device of claim 5, wherein the first plurality of quality levels is based at least in part on a playback history corresponding to the first viewer device, and the second plurality of quality levels is based at least in part on a playback history corresponding to the second viewer device.

10. The computing device of claim 5, wherein the first plurality of quality levels is based at least in part on characteristics of the first indication, and second plurality of quality levels is based at least in part on characteristics of the second indication.

11. A computer program product comprising one or more non-transitory computer-readable media having computer program instructions stored therein, the computer program instructions being configured such that, when executed by one or more computing devices, the computer program instructions cause the one or more computing devices to:

receive a first indication that a first viewer device has requested media content;

generate first manifest data representing playback options of the media content at a first plurality of quality levels selected based on characteristics of the first viewer device, each of the first plurality of quality levels being associated with one of a plurality of request formats for requesting fragments of the media content, each of the plurality of request formats corresponding to playback of the requested media content corresponding to the first indication, a first quality level of the first plurality of quality levels being associated with a first request format in the plurality of request formats, the first request format representing a fragment of the media content that is at a quality level different than the first quality level;

provide the first manifest data for playback of the media content at the first viewer device;

receive a first request from the first viewer device for a first fragment corresponding to a first segment of the media content, the first request having been generated by the first viewer device to obtain a fragment at the first quality level of the first plurality of quality levels represented in the first manifest data;

provide to the first viewer device, in accordance with the first manifest data, a second fragment corresponding to the first segment of the media content, the second fragment corresponding to a second quality level of the first plurality of quality levels represented in the first manifest data that is different than the first quality level represented in the first manifest data.

12. The computer program product of claim 11, wherein the first plurality of quality levels has a different number of quality levels than the second plurality of quality levels.

13. The computer program product of claim 11, wherein the first and second manifest data include data representing fragments corresponding to segments of a video portion of the playback of the media content, and the quality levels correspond to different bitrates corresponding to playback of the media content.

14. The computer program product of claim 11, wherein the first plurality of quality levels is based at least in part on a determination that the first viewer device is a first device type, and the second plurality of quality levels is based at least in part on a determination that the second viewer device is a second device type, the first device type and the second device type being different.

15. The computer program product of claim 11, wherein the first plurality of quality levels is based at least in part on a playback history corresponding to the first viewer device, and the second plurality of quality levels is based at least in part on a playback history corresponding to the second viewer device.

16. The computer program product of claim 11, wherein the first plurality of quality levels is based at least in part on characteristics of the first indication, and second plurality of quality levels is based at least in part on characteristics of the second indication.

17. The computer implemented method of claim 1, wherein the second quality level corresponds to a higher bit rate or lower bit rate than the first quality level.

* * * * *